Nov. 15, 1960
A. DE RUDNAY
2,960,642
DIELECTRIC FILMS AND CAPACITORS EMPLOYING THE SAME
Filed April 17, 1958
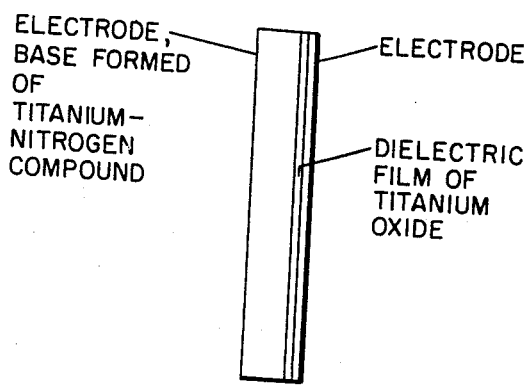
INVENTOR.
ANDRE DeRUDNAY
BY
KENWAY, JENNEY, WITTER & HILDRETH
ATTORNEYS

United States Patent Office 2,960,642
Patented Nov. 15, 1960

2,960,642

DIELECTRIC FILMS AND CAPACITORS EMPLOYING THE SAME

André de Rudnay, Paris, France, assignor to Quartz & Silice S.A., Paris, France, a corporation of France Filed Apr. 17, 1958, Ser. No. 729,072

3 Claims. (Cl. 317—258)

This invention relates to titanium oxide dielectric films and to capacitors and capacitor electrodes employing such films. An object of this invention is to provide an improved titanium oxide dielectric film having a high dielectric strength and a low power factor, and to provide improved capacitors and other devices employing dielectrics and electrodes of this type.

In capacitors of both the electrolytic and the electrostatic type it has heretofore been common to employ a metal electrode having an oxide coating which serves as a dielectric film separating the electrode from a second electrode. For best results the oxide film should have a high dielectric breakdown strength and a low power factor, and in the case of an electrolytic capacitor, the film, in conjunction with the metal base, should exhibit a rectifying action. It has also been known that titanium metal having a surface coating of titanium oxide can be employed in capacitors of both the electrolytic and electrostatic type, but such films of titanium oxide have been found to have a very low breakdown strength, particularly where the oxide film is formed by surface oxidation of the titanium base. A further drawback to the use of titanium electrodes having surfaced oxidized films is their tendency to exhibit a "memory" effect, which is believed to be attributed to a long lasting polarization, similar to that impressed upon electric batteries (see Dummer, Fixed Capacitors, Pitman, 1956).

The present invention is based on the discovery that a greatly improved titanium oxide dielectric film may be formed by employing a base having a surface composed of a compound of titanium and nitrogen, in place of a pure titanium surface.

The relative proportions of titanium and nitrogen in the base surface subjected to oxidation may vary within a rather wide range, from equal atomic proportions of titanium and nitrogen which correspond to the compound TiN down to as low as 10 atomic percent of nitrogen. Pure compounds consisting entirely of titanium and nitrogen are preferred, but minor amounts of other elements capable of forming dielectric oxide films, such as aluminum, tantalum and zirconium may also be present. Oxygen may also be present in the base compound. The term "titanium-nitrogen compound" is used herein to designate these compounds which consist essentially of titanium and nitrogen in various ratios, including titanium nitride as well as compounds of lower nitrogen content.

An oxide film formed by oxidizing the surface of such a base is markedly superior to a titanium oxide film formed from titanium alone in having a lower power factor, and a markedly higher dielectric breakdown strength, and in largely avoiding the "memory" effect. The improved effects of employing a base compound of a titanium-nitrogen compound is believed to be attributed to the geometrical modification of the titanium lattice by the combination of the titanium with nitrogen.

A further advantage of forming the titanium oxide film on a base of a compound of titanium and nitrogen lies in the higher conductivity of the titanium and nitrogen compound. Whereas the specific resistivity of pure titanium is about 42 micro ohms per centimeter, that of titanium nitride, TiN, is about 10 micro ohms per centimeter. As a consequence the thickness of the metallic electrode base formed of the titanium-nitrogen compound may be greatly reduced from that required where the base is pure titanium, without any sacrifice of conductivity.

A further advantage of employing an electrode base consisting of compounds of titanium and nitrogen lies in the greater physical and chemical stability of the nitride compound. Titanium metal, particularly that formed by condensation in a vacuum evaporation process, is softer and more easily attacked by inorganic acids than titanium nitride. Only a few atomic percent of nitrogen present in the titanium considerably hardens the metal and increases its chemical resistance.

Numerous techniques may be employed in forming dielectric films of titanium oxide in accordance with this invention. A base member consisting of pure titanium nitride may be surface oxidized, for instance electrolytically by employing the titanium nitride base as an anode in an electrolyte such as ammonium tartrate, boric acid or nitric acid to form an anodic oxidized film, or by heating the titanium nitride base in an oxygen atmosphere, or by ion bombardment with an inorganic oxidizing compound.

Instead of a base member consisting of pure titanium nitride, the base member may be formed by nitriding a titanium body to form a surface stratum of a compound of nitrogen and titanium. Conventional techniques may be used, a suitable one being the depositing of a surface film of titanium from the atomic state, as by vacuum evaporation, in the presence of small amounts of nitrogen gas.

The improved nature of the titanium oxide film formed in accordance with this invention as compared with titanium oxide films formed directly from titanium alone is believed to be accounted for by the enlargement or expansion of the titanium lattice which occurs when the titanium is combined with nitrogen. The most effective titanium oxide films are those consisting of titanium dioxide in the form of rutile or octahedrite (also known as anatase). These oxides have a specific volume from 73% (rutile) to 78% (octahedrite) higher than titanium. Titanium, however, undergoes a 9% volume expansion when nitrided, and as a result the oxidation of the nitrided titanium to either of the two forms of $TiO_2$, may proceed more readily and to a greater depth. When pure titanium is oxidized there is a tendency to form lower titanium oxides and a non-homogeneous oxidation pattern, which is believed to account for the "memory" effect.

The foregoing hypothesis is offered as a possible explanation of the improved results resulting from this invention, but is not offered as a definition of the invention, nor is it intended to have any limiting effect. That other explanations may be advanced and proved more correct should not in any way limit the scope of this invention.

This invention is described in detail with reference to preferred embodiments in the following examples, which have been selected for purposes of illustration:

Example 1

In this process an electrode film of a titanium-nitrogen compound is formed by a vacuum evaporation technique in the course of which the titanium-nitrogen compound is formed. The oxide film is subsequently formed by anodic oxidation.

The process is carried out in conventional vacuum evaporation apparatus, such as that described by L. Holland, "Vacuum Deposition of Thin Films" (Chapman & Hall, 1956), pp. 7–14, 113–115, 119.

The pressure within the evaporation chamber is reduced to about $5\text{--}8 \times 10^{-6}$ mm. Hg, and pure titanium is then evaporated onto two glass targets. After a condensed film of titanium of about 1 micron in thickness has been deposited, one of the glass targets is covered so that the continued deposition of titanium occurs only on the other target. At the same time pure dry nitrogen gas is introduced into the evaporation chamber and maintained therein at a pressure of about $10^{-4}$ mm. Hg and evaporation is continued until the film thickness has increased by about 1 micron, at which time evaporation is stopped and the chamber is opened. The film composed of titanium and nitrogen has a distinct brown bronze color which is in marked contrast to the silvery metallic appearance of the pure titanium film. X-ray examination shows that the titanium-nitrogen film is of cubic crystalline structure, whereas the pure metallic titanium film is of close-packed hexagonal crystal structure.

The films are next oxidized anodically in an electrolyte which may consist of an aqueous solution of boric acid (saturated), or an aqueous solution containing about 3% by weight of tartaric acid which has been adjusted to a pH of about 5 by the addition of ammonium hydroxide. The pure titanium film may be oxidized by utilizing it as an anode in the electrolyte at an implied potential of about 4–5 volts. Current will flow in either direction when the applied potential is 6 volts or more.

The film composed of titanium and nitrogen is anodically oxidized in the same manner, but it is found that full rectification occurs at much higher voltages and that the reverse current quickly drops to a negligible value of less than a microampere per microfarad of capacitance. The applied voltage may be raised gradually to 600 volts to form a dielectric film of considerable thickness. The anodized titanium-nitrogen electrode may then be employed in electrolytic or electrostatic capacitors in the conventional manner.

*Example 2*

The procedure here is the same as in Example 1 with the exception that instead of admitting nitrogen to the evaporation chamber, pure dry air is admitted and maintained at a pressure of $10^{-4}$ mm. Hg.

*Example 3*

In this example the titanium nitrogen compound is formed by sputtering an alloy consisting of 90% by weight of titanium and 10% by weight of tantalum in an atmosphere of nitrogen under reduced pressure, and then collecting or condensing the vapor on a fused silica target in the form of a compound consisting of titanium, tantalum and nitrogen. Conventional apparatus and techniques are employed such as that described by W. Janeff, "Zeitschrift für Physik," vol. 142 (1955), pp. 619–636.

It will be understood that the foregoing processes are only illustrative and that other techniques for forming titanium nitride compositions may be employed, such as those described by Kieffer and Schwarzkopf, "Refractory Hard Metals," McMillan, 1953, including vapor phase deposition, nitriding of titanium, nitriding of titanium dioxide, to name but a few. Other oxidation techniques may also be employed such as bombardment by oxygen ions at reduced pressures, heat treatment in an oxygen atmosphere, being other examples.

Although glass and fused silica targets have been described as supporting materials for the partially or fully oxidized titanium-nitrogen compounds, other suitable supporting materials of various types such as ceramics, metals, plastics and the like may be employed, or self-supporting electrodes of titanium or titanium-nitrogen compositions may be used.

Inasmuch as the structure of capacitors, both electrostatic and electrolytic, are well known in the art and the improved electrode and dielectric film of this invention is incorporated into such capacitors in the conventional manner, a complete description of capacitors is unnecessary to a full understanding of this invention. The use of surface-oxidized electrodes in capacitors is fully described in Güntherschulze and Betz, "Elektrolyt Kondensatoren," 2nd edition, Technischer Verlag Herbert Cram, Berlin W 35, 1952.

In general a capacitor embodying this invention consists of an electrode comprising a film of titanium oxide formed on a base composed of a compound of titanium and nitrogen, with a second electrode electrically separated by the oxide film which serves as the dielectric. The second electrode may be a metallic plate or foil in an electrostatic condenser, or an electrolyte in an electrolytic condenser. Capacitors thus formed are generally superior to ordinary capacitors employing a titanium electrode and a titanium dioxide dielectric, and are quite simple and inexpensive. Accordingly this invention will be seen to constitute a valuable advance in the art.

Having thus disclosed my invention and described in detail preferred embodiments thereof, I claim and desire to secure by Letters Patent:

1. The method of making an electrode comprising depositing titanium on a base surface in the presence of nitrogen to form a layer of titanium-nitrogen compound, and oxidizing said surface to form a dielectric film comprising titanium dioxide.

2. A capacitor having an electrode comprising a conductive base surface formed of a titanium-nitrogen compound, a dielectric layer of titanium dioxide on said base surface, and a second electrode in capacitive relation to said conductive base surface and separated therefrom by said dielectric layer.

3. In an electrical capacitor, an electrode having a base surface formed of a titanium-nitrogen compound and a dielectric layer of titanium-dioxide on said base surface.

References Cited in the file of this patent

UNITED STATES PATENTS

| | | |
|---|---|---|
| 1,098,794 | Fleming | June 2, 1914 |
| 1,794,810 | Van Arkel et al. | Mar. 3, 1931 |
| 1,925,857 | Van Liempt | Sept. 5, 1933 |
| 2,191,331 | Van Liempt | Feb. 20, 1940 |
| 2,373,098 | Brennan | Apr. 10, 1945 |
| 2,459,792 | Chevigny | Jan. 25, 1949 |